(12) United States Patent
Dewa et al.

(10) Patent No.: US 6,230,279 B1
(45) Date of Patent: May 8, 2001

(54) SYSTEM AND METHOD FOR DYNAMICALLY CONTROLLING PROCESSING SPEED OF A COMPUTER IN RESPONSE TO USER COMMANDS

(75) Inventors: Koichi Dewa; Masayo Yamaki; Fumitaka Sato, all of Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/563,820

(22) Filed: May 3, 2000

Related U.S. Application Data

(63) Continuation of application No. 09/073,808, filed on May 7, 1998, now Pat. No. 6,081,901.

(30) Foreign Application Priority Data

Jun. 3, 1997 (JP) .................................................. 9-145253

(51) Int. Cl.[7] ...................................................... G06F 1/32
(52) U.S. Cl. ........................................... 713/324; 713/322
(58) Field of Search ........................... 712/240; 713/300, 713/320, 322, 323, 324, 321

(56) References Cited

U.S. PATENT DOCUMENTS

| | | |
|---|---|---|
| 4,137,563 | 1/1979 | Tsunoda . |
| 4,381,552 | 4/1983 | Nocilini et al. . |
| 4,851,897 | 7/1989 | Inuma et al. ............................ 358/29 |
| 5,142,684 | 8/1992 | Perry et al. . |
| 5,222,239 | 6/1993 | Rosch . |
| 5,228,131 * | 7/1993 | Veda et al. ............................ 712/240 |
| 5,452,401 | 9/1995 | Lin . |
| 5,504,910 | 4/1996 | Wisor et al. . |
| 5,560,017 | 9/1996 | Barrett et al. . |
| 5,586,332 * | 12/1996 | Jain et al. ............................. 713/322 |
| 5,664,201 | 9/1997 | Ikedea . |
| 5,719,800 * | 2/1998 | Mittal et al. ........................... 713/321 |
| 5,737,613 | 4/1998 | Mensch, Jr. . |
| 5,740,417 * | 4/1998 | Kennedy et al. ..................... 712/240 |
| 5,742,832 | 4/1998 | Buxton et al. . |
| 5,761,517 | 6/1998 | Durham et al. . |
| 5,768,602 | 6/1998 | Dhuey . |
| 5,812,860 | 9/1998 | Horden et al. . |
| 5,826,092 | 10/1998 | Flannery . |
| 5,887,178 | 3/1999 | Tsujimoto et al. . |
| 5,951,689 * | 9/1999 | Evoy et al. ........................... 713/322 |
| 6,081,901 * | 6/2000 | Dewa et al. .......................... 713/300 |
| 6,108,776 * | 8/2000 | Check et al. ......................... 712/240 |

* cited by examiner

Primary Examiner—Glenn A. Auve
(74) Attorney, Agent, or Firm—Finnegan, Henderson, Farabow, Garrett & Dunner, L.L.P.

(57) ABSTRACT

When a user instructs acceleration or deceleration of the CPU processing speed with an "accelerator" button or a "brake" button, a speed control MMI informs power management system software of the corresponding information to change the CPU processing speed. The change is recorded on a speed management database in correspondence with the name of the application program which is currently being executed. Every time acceleration or deceleration of the CPU processing speed is instructed by the user, speed management data is formed on the speed management database. By using the speed management data, the CPU processing speed can be dynamically controlled for each piece of software when it is executed. Further disclosed is a novel power dissipation control system for a microprocessor, adapted to be used in conjunction with the above described MMI.

19 Claims, 10 Drawing Sheets

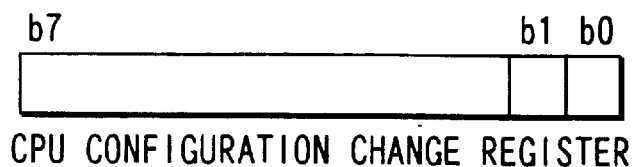
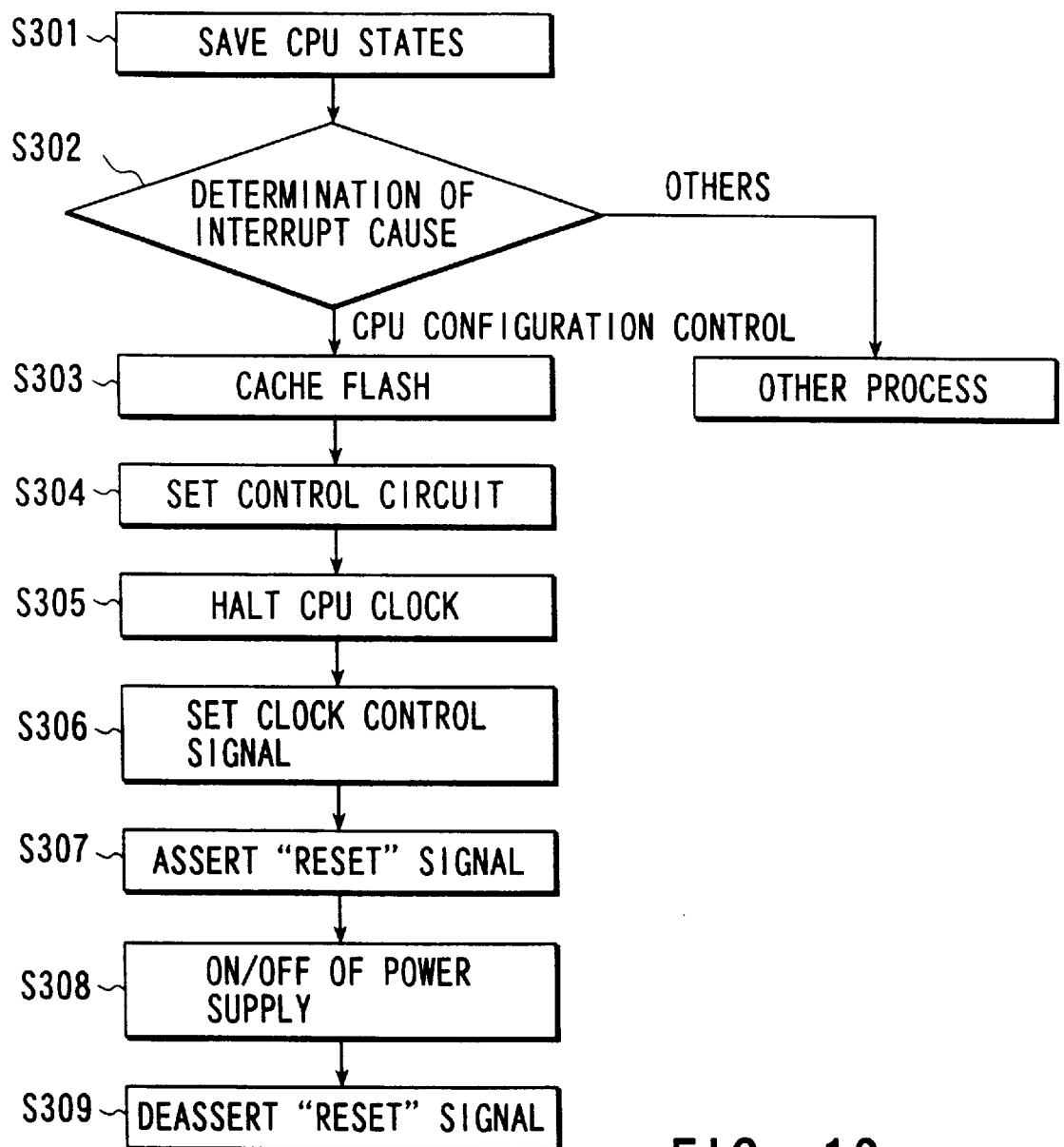

SPEED CONTROL WINDOW

SYSTEM AND METHOD FOR DYNAMICALLY CONTROLLING PROCESSING SPEED OF A COMPUTER IN RESPONSE TO USER COMMANDS

This is a continuation of application Ser. No. 09/073,808, filed May 7, 1998 now U.S. Pat. No. 6,081,901 incorporate herein by reference.

BACKGROUND OF THE INVENTION

This application is based on Japanese Patent Application No. 9-145253, filed Jun. 3, 1997, the content of which is incorporated herein by reference.

The present invention relates to a computer system and a processing speed control method therefor and, more particularly, to a computer system that can variably control the Central Processing Unit processing speed so as to realize a power management function and a CPU processing speed control method used in the system.

Recently, various types of notebook personal computers which can be easily carried and operate on batteries have been developed. Various types of power saving functions are provided for such personal computers. The principal object of these power saving functions is to reduce the consumption of battery power so as to prolong the operating time. To save power consumption, the CPU processing speed is decreased.

With the recent improvement in the performance of microprocessors, the power consumption continues to increase. In portable computers, therefore, serious problems are posed in terms of heat dissipation measures for the microprocessors. For this reason, to reduce the power consumption by decreasing the CPU processing speed is important as a measure to prevent an excessive rise in the temperature of a microprocessor or the like.

In conventional CPU processing speed control techniques, when a CPU or a peripheral unit stops significant processing and waits for an event to take place, the clock rate is decreased or the supply of power is stopped to reduce the power consumption. Many such techniques have been known as described below.

(1) U.S. Pat. No. 4,137,563: Heat dissipation is suppressed by intermittently outputting minimum clock pulses necessary to operate a unit standing by.

(2) U.S. Pat. No. 4,381,552: The supply of clocks to the CPU and memory of the portable electronic device is stopped in an inoperative state.

(3) U.S. Pat. No. 4,851,897: The CPU clock is stopped while waiting for a key input or interruption. The supply of clocks to the I/O is not stopped. In general the processor waits for a long period of time in an idle loop. With this operation, therefore, the power consumption decreases, and the battery life can be greatly extended.

(4) U.S. Pat. No. 5,142,684: The low-speed second CPU with low power consumption is used to monitor the state of the system during an idle time. In this period, the power supply for the high-speed CPU is turned off. This high-speed CPU selects the clock rate in accordance with the task to be executed.

(5) U.S. Pat. No. 5,222,239: The clock frequency of the CPU is decreased when high system performance is not required.

(6) U.S. Pat. No. 5,452,401: The clocks to a plurality of units on one chip are turned on/off very quickly in accordance with the operation states of the units, thereby saving power and suppressing generation of heat.

(7) U.S. Pat. No. 5,560,017: The frequency of the system clock is decreased by the BIOS software while an event is waited for.

Various techniques have also been known for monitoring the temperature of a CPU and reducing the power consumption when the temperature is at a predetermined value or more. Furthermore, techniques, in combination with the above techniques, have been known for uniformly setting a CPU's processing speed as a user's choice without taking account of the details of the contents of the process performed by the CPU, such as the one which permits a user to alternately set a high performance mode and a power saving mode.

All these techniques only decrease the processing speed irrespective of the type of the software in execution, but have no mechanism for reflecting user's expectations and intentions with regard to the respective processing speeds of the individual software.

More specifically, the CPU processing speed cannot be dynamically changed at a user's wish while the user is working with the computer. These techniques cannot therefore meet user's requirements, e.g., giving higher priority to the processing speed than power saving in accordance with the contents of the currently executed task or decreasing the CPU processing speed in tasks other than specific tasks to prolong the life of the battery.

The conventional technique of decreasing the operating speed of the CPU by decreasing the clock rate is effective in extending the battery life. It should be noted, however, that this technique does not decrease the energy required for the execution of a given task.

Even if the clock rate of the CPU is decreased, there is no trade-off between the time required for the execution of a given task and the energy required therefor. In consideration of the power consumed by a CMOS logic circuit, the energy consumed by the CMOS logic circuit is proportional to the number of execution clocks/cycles in terms of linear approximation, but is not proportional to the execution time. Even if, therefore, the clock rate is changed, the amount of energy required to complete a given task remains the same as long as the number of clocks required to complete the task remains the same.

BRIEF SUMMARY OF THE INVENTION

It is an object of the present invention to provide a computer system which can realize CPU processing speed control reflecting user's intentions, and harmonize the need to reduce the power consumption with the user's wish to obtain a comfortable execution speed, and a processing speed control method therefor.

It is another object of the present invention to provide a computer system which can trade off the time required to execute a given task against the energy required for the task, and a processing speed control method therefor.

According to the present invention, there is provided a computer system capable of variably controlling a processing speed of a CPU, comprising means for receiving an acceleration or deceleration instruction from a user by using a user interface which allows the user to instruct acceleration and deceleration of the processing speed of the CPU, means for changing the current processing speed of the CPU in accordance with the acceleration or deceleration instruction, and means for defining speed management data indicating a CPU processing speed for execution of each piece of software by recording a result obtained by changing the processing speed of the CPU in correspondence with software currently executed in the computer system, wherein the CPU processing speed can be controlled for each piece of software in accordance with the speed management data.

In this computer system, when acceleration or deceleration of the CPU processing speed is instructed by the user through an interface such as a hot key or a button on the display screen, the CPU processing speed is dynamically changed accordingly. The user can therefore dynamically change the current CPU processing speed by manipulating a hot key or button, and can freely change the processing speed in accordance with the contents of a task. This change is recorded as speed management data in correspondence with the name of software such as an application program which has been executed when the processing speed was changed. Every time the user instructs acceleration or deceleration of the CPU processing speed, speed management data is formed. By using the speed management data, the CPU processing speed can be controlled for each piece of software when it is executed. CPU processing speed control can therefore be performed in accordance with a user's intentions such that the CPU processing speed is increased when several specific pieces of software are executed, but decreased for other pieces of software to realize power saving and the like, thus harmonizing the need to reduce the power consumption with the user's wish to obtain a comfortable execution speed.

As a user interface for receiving CPU processing speed acceleration/deceleration instructions from the user, a key or button for instructing acceleration and a key or button for instructing deceleration are preferred. With these keys or buttons, the user can easily instruct acceleration/deceleration of the CPU processing speed in the same manner as the accelerator and brake of a vehicle.

In addition, according to the present invention, there is provided a new computer system which allows trade-off between the time required for the execution of a given task and the energy required therefor. The trade-off is accomplished by enabling or disabling branch prediction of the CPU. Generally, the state-of-the-art microprocessor predicts a branch destination by using a branch prediction mechanism and performs parallel processing for both cases in which a prediction is fulfilled. This invention provides means for ON/OFF-controlling the branch prediction mechanism by ON/OFF-switching supply of power or clocks to a logic circuit implementing the branch prediction mechanism in accordance with a processing speed change request from a user, wherein energy consumption required to complete the same task is variably set.

Conventionally, in a CPU that performs predictive parallel processing by using a branch prediction mechanism, an instruction word is fetched and decoded in advance in two directions, i.e., the direction in which the program branches in accordance with the conditional branch instruction and the direction in which the program does not branch, and one of the decoded words is discarded when the condition is confirmed. Fetching and decoding an instruction word in the two directions in advance will increase the processing speed, but the power consumption increases as compared with a case in which an instruction word is decoded only in one direction. This is because circuits corresponding to both cases in which a prediction is fulfilled and not fulfilled are operated, and a result of operation of one circuit becomes unnecessary and is discarded. If the computer executes only necessary tasks in a fixed manner without performing such predictive parallel processing, the energy consumption can be essentially decreased at the cost of a decrease in processing speed. According to the present invention, therefore, the ON/OFF of the branch prediction mechanism is controlled by ON/OFF-switching the supply of power or clocks to the logic circuit implementing the branch prediction mechanism in accordance with a deceleration instruction from the user. With this arrangement, a true trade-off between the time required for the execution of a given task and the energy required therefor can be realized.

Furthermore, according to the present invention, there is provided a computer system including an Operating Systems (hereinafter OS) having both a function of controlling application software and a function of controlling power consumption of a computer, comprising a speed control man-machine interface added to a module having the function of controlling the power consumption, the speed control man-machine interface including first means for allowing a user to request the system to shift to a mode of completing processing in a short period of time but using large power, and second means which is different from the first means and allows the user to request the system to shift to a mode of completing processing in a long period of time by using small power, wherein the user gives a request associated with a processing speed with respect to the OS, and the OS can make an adjustment between the requested processing speed and an environment condition including power consumption.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 9 is a view showing the arrangement of a CPU configuration change register used in the computer system of the embodiment in FIG. 7;

FIG. 10 is a flow chart showing a procedure for enable/disable switching of the predictive parallel processing function of a CPU used in the computer system of the embodiment in FIG. 7;

DETAILED DESCRIPTION OF THE INVENTION

The preferred embodiments of the present invention will be described below with reference to the accompanying drawings.

Figure 1:
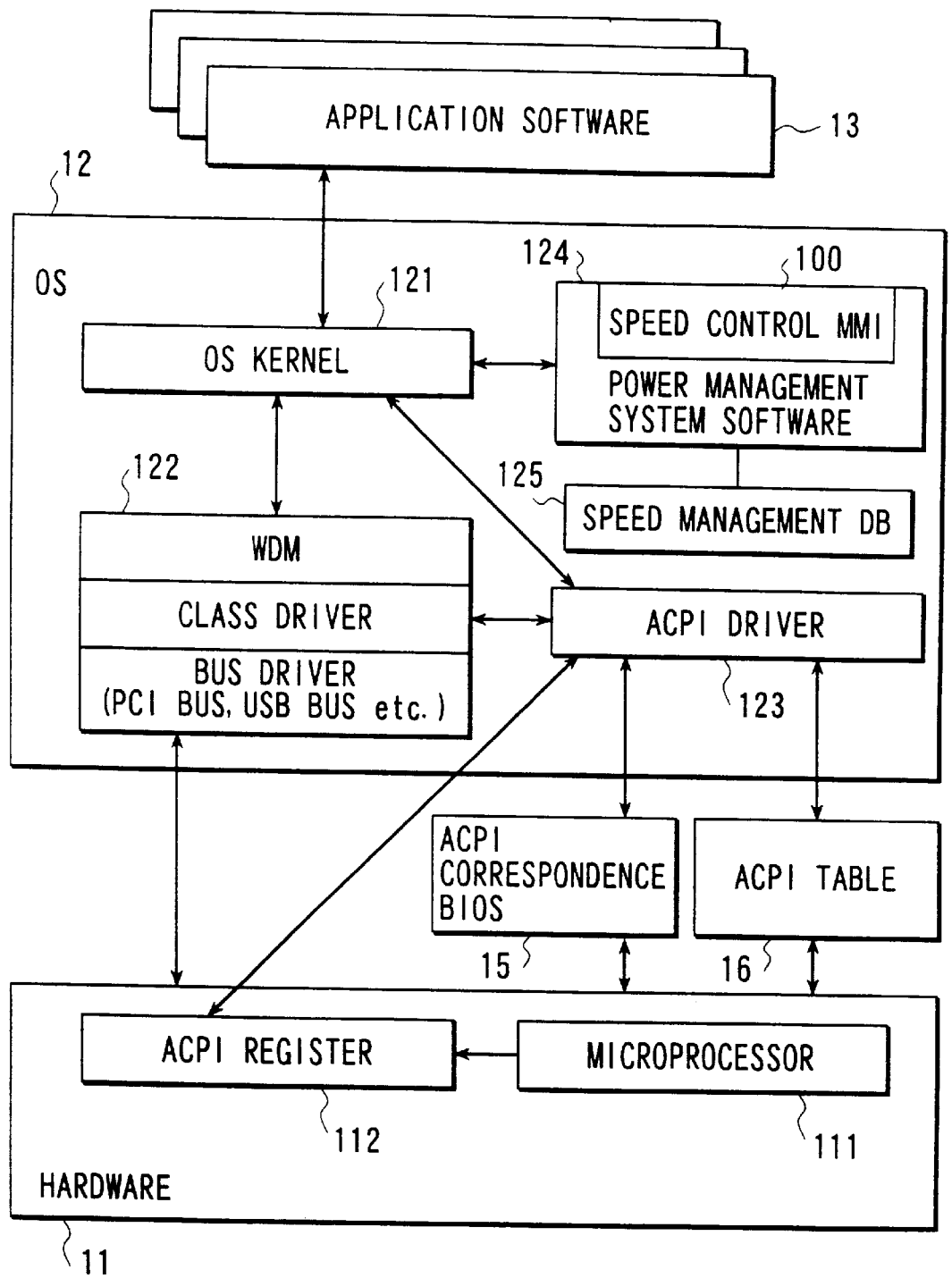
FIG. 1 is block diagram showing the overall arrangement of a computer system according to an embodiment of the present invention.

FIG. 1 shows the overall arrangement of a computer system according to an embodiment of the present invention. This computer system is a notebook personal computer which can be battery-driven. In this computer implemented is ACPI (Advanced Configuration and Power Interface Specification) which is a power management architecture proposed by the following three corporations: TOSHIBA CORP., INTEL CORP., and MICROSOFT CORP. According to ACPI, all power management operations for various types of hardware 11 on the mother board are directly managed and controlled by an operating system (OS) 12. Such a mechanism is called OSPM (Operating System Directed Power Management).

The operating system (OS) 12 has an OS kernel 121, device drivers 122, an ACPI driver 123, and power management system software 124. The device drivers 122 are a standard interface for power management, and include a driver (class driver) for managing each device, a driver (bus driver) for managing buses (a PCI bus, a USB bus, and the like), a driver for complying with WDM (Windows Driver Model), and the like. The ACPI driver 123 performs power control of the hardware by using an ACPI correspondence BIOS 15, an ACPI table 16, and an ACPI register 112. The characteristics of each piece of hardware are written on the ACPI table 16. Actual power management of a given piece of hardware is performed by using the ACPI register 112 corresponding to the device. Referring to FIG. 1, the ACPI register 112 corresponds to a microprocessor 111 serving as a CPU.

The power management system software 124 is constituted by OSPM system codes, and serves to execute tasks for power management. In this embodiment, the power management system software 124 includes a speed control MMI (Man-Machine Interface) 100. The speed control MMI 100 is used to realize CPU processing speed control reflecting a user's intentions. More specifically, the speed control MMI 100 provides an interface for receiving CPU processing speed acceleration/deceleration instructions from the user. Upon reception of a CPU processing speed acceleration or deceleration instruction from the user through this interface, the speed control MMI 100 changes the CPU processing speed by using the power management system software 124, the ACPI driver 123, and the ACPI register 112. This change result is recorded on a speed management database 125 in correspondence with the name of application software 13 which is currently being executed. Subsequently, the CPU processing speed is determined for each piece of software on the basis of the speed data managed by the OS 12.

The user interface provided by the speed control MMI 100 is implemented by using hot keys or a speed control window.

When the user interface implemented by hot keys is to be used, an "accelerator" hot key for issuing an acceleration instruction and a "brake" hot key for issuing a deceleration instruction are assigned to predetermined keys on the keyboard used in the computer system. When the user wants to increase the processing speed while he/she is using the personal computer, he/she depresses the "accelerator" hot key to signal his/her intention. When the user wants to prolong the battery life by decreasing the processing speed while he/she is using the personal computer, he/she depresses the "brake" hot key to signal his/her intention.

In this case, the hot keys are specific keys prepared to cause the CPU to execute predetermined functions by SMI (System Management Interrupt) or the like without influencing the current software environment. In this embodiment, a combination (simultaneous operation) of the Fn key and the F9 key (Fn+F9) is assigned to the "accelerator" hot key, and a combination (simultaneous operation) of the Fn key and the F8 key (Fn+F8) is assigned to the "brake" hot key. This key assignment is performed to set the "brake" key on the left side of the "accelerator" key. Such a correspondence between the hot keys and the accelerator and brake pedals of a vehicle allows the user to easily manipulate the keys. The user can set a program for checking the effect obtained by the depression of a hot key on the screen, or can omit such screen display.

The operations performed after the hot keys are depressed are the same as in the following cases of an "accelerator" button and a "brake" button.

Figure 2:
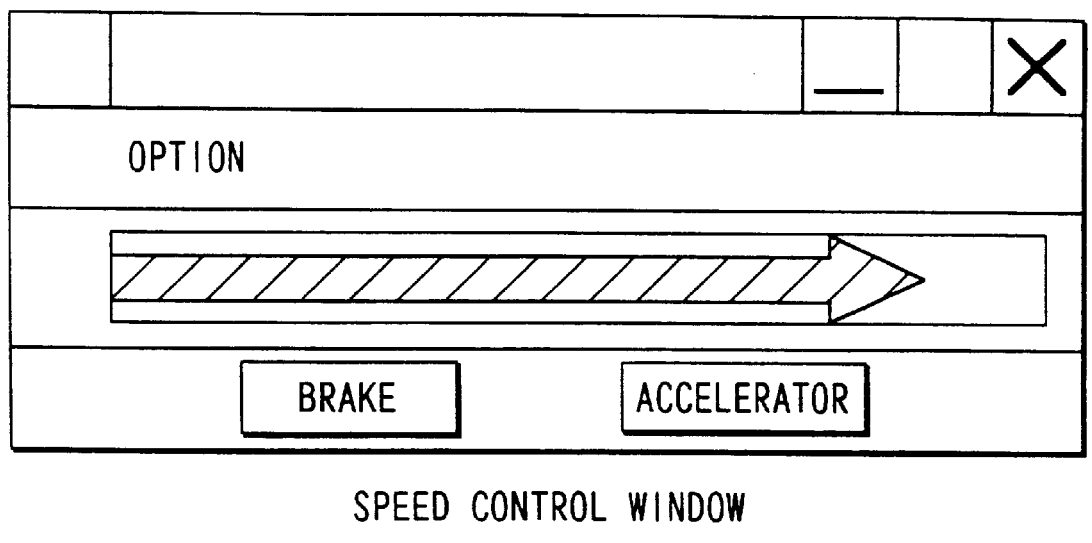
FIG. 2 is a view showing an example of the speed control window applied to the computer system of the embodiment.

When the speed control window is displayed, and the buttons in the window are manipulated, the same effects as those obtained when the above hot keys are depressed are obtained. FIG. 2 is an enlarged view of the speed control window. The speed control window is generally displayed on the task bar, similar to other resident programs. When this speed control window is opened, the screen picture shown in FIG. 2 is displayed. On the speed control window, the "accelerator" button and the "brake" button are defined. By clicking the "accelerator" button with a mouse, the user indicates his/her intention of increasing the processing speed. By clicking the "brake" button, the user indicates his/her intention of trading off the processing speed against the battery life.

A method of using the speed management database 125 will be described next.

The speed management database 125 is used to link the processing speed that has been changed in accordance with an instruction from the user with the application that is currently executed.

Assume that the user depresses the accelerator key while an application A is executed. In this case, the changed processing speed is recorded on the speed management database 125, together with the name of the application A. When the user starts to use an application B after the execution of the application A, the CPU processing speed is automatically switched to the speed for the application B which has previously been recorded on the speed management database 125. If the application B is not registered in the speed management database 125, the processing speed is switched to a standard speed. The same applies to a case in which the user temporarily stops the processing of the application A to switch to the processing of the application B (in Windows developed by MICROSOFT CORP, the focus shifts from the window of the application A to the window of the application B, and the window of the application B becomes an active window). If the application B is not registered in the database, the immediately preceding processing speed is preferably set in some case for the reason to be described later.

In many cases, only one specific user uses the personal computer. If, therefore, the speed set by the user for the application A is stored, when, for example, the user is to execute the application A, the speed previously set for the application A can be automatically set. For example, the user who used the text editor at a low speed is more likely to select the low speed for the text editor on the next day. To realize such an operation, the speed management database 125 is used to select the processing speed corresponding to the software to be executed.

Figure 4:
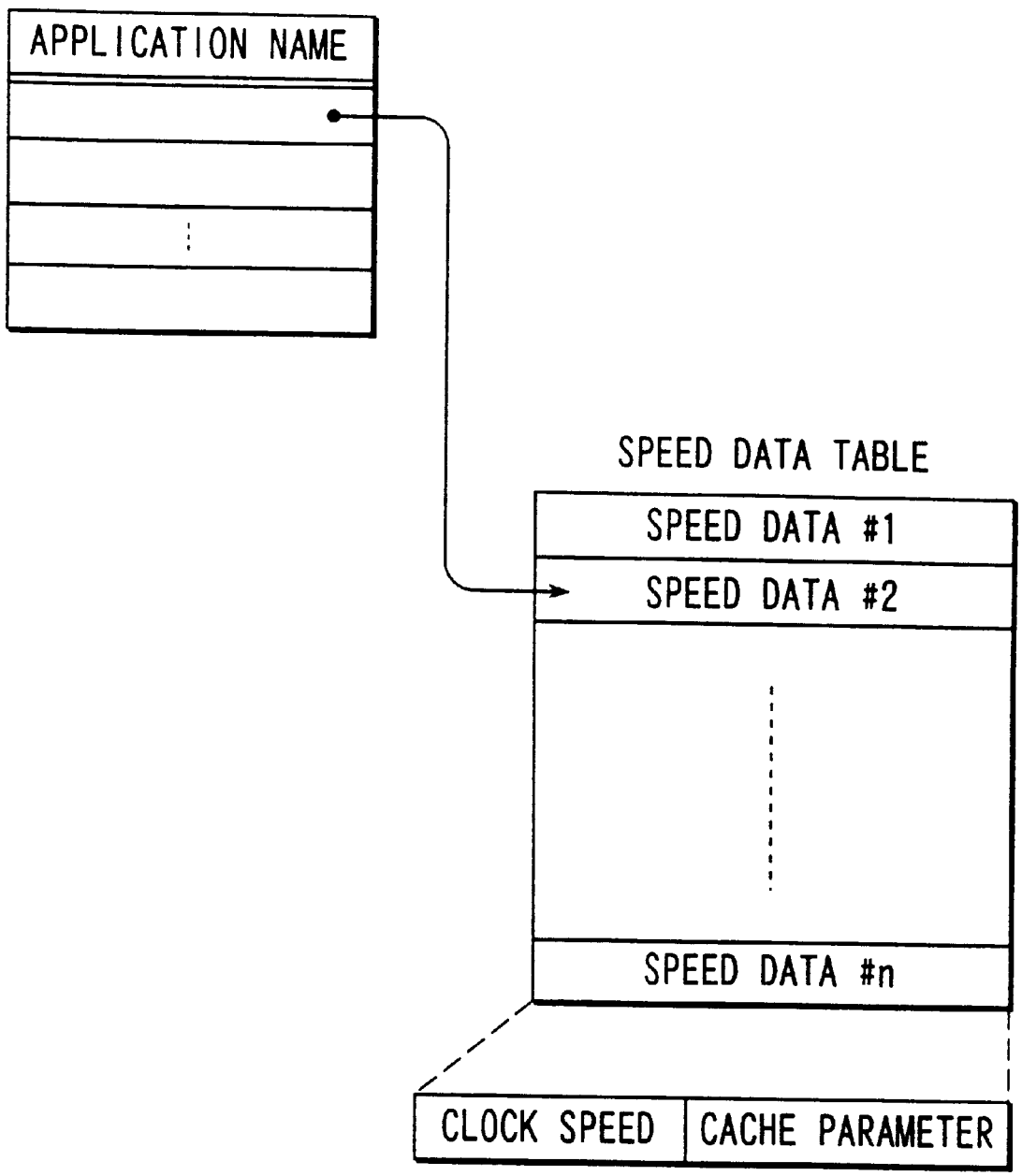
FIG. 4 is a view showing the structure of a speed management database used in the computer system of the embodiment.

FIG. 4 shows the structure of the speed management database 125.

This speed management database 125 is implemented by using a registry of Windows. The registry is a database used by the OS to perform centralized control of the setting environment associated with device drivers and application programs. A hierarchy for speed control is added to this registry to implement the speed management database 125 which holds application (process) names as keys and pieces of speed information as values, as shown in FIG. 4. It suffices in practice if speed control can be performed in several levels. A 1-byte integer is sufficient for the value of each piece of speed data. When more sophisticated speed control is to be realized, a combination of a clock rate, a cache size, and the like is preferably used as the value of each speed data, as shown in FIG. 4.

Figure 5:
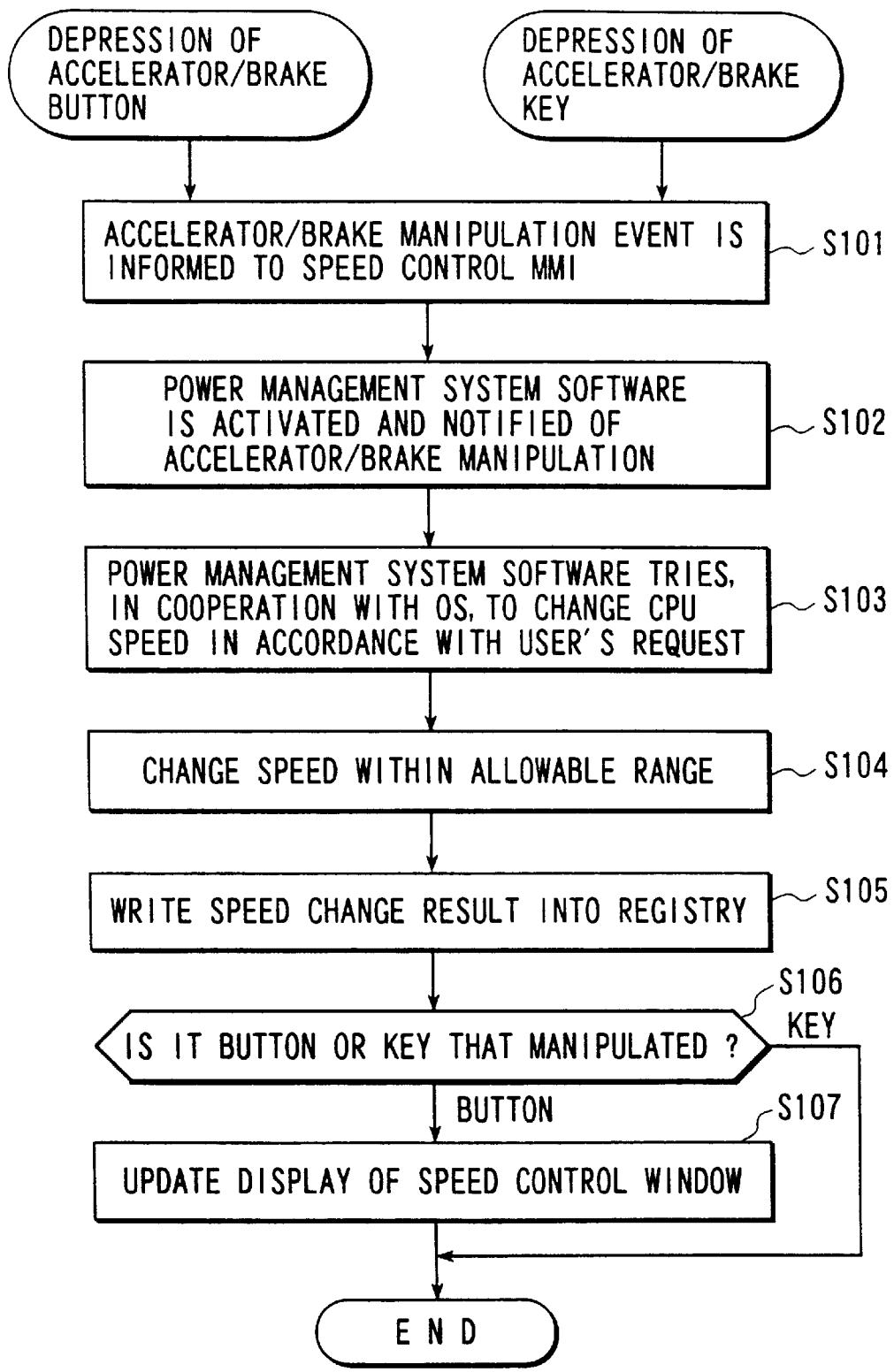
FIG. 5 is a flow chart showing a procedure for accelerating/decelerating the CPU processing speed in the computer system of the embodiment.

The speed control operation to be executed upon reception of a speed control instruction from the user through the speed control window in FIG. 2 will be described next with reference to FIG. 5.

When the user manipulates the "accelerator" button or the "brake" button, the speed control MMI 100 is informed of the corresponding event (step S101). The speed control MMI 100 recognizes the user's intention from this event, and instructs the power management system software 124 to change the CPU processing speed (step S102).

If the instructed speed falls inside an allowable range in terms of power management, the power management system software 124 changes the CPU processing speed to the instructed speed by using the ACPI driver 123 and the ACPI register 112, and informs the speed control MMI 100 of the change result (steps S103 and S104). CPU processing speed control is performed by changing the CPU clock rate or increasing/decreasing the cache size. If the instructed speed falls outside the allowable range, the power management system software 124 informs the speed control MMI 100 of the corresponding information. In accordance with this operation, the speed control MMI 100 records the changed CPU processing speed on the speed management database 125 in correspondence with the name of the software which is currently being executed (step S105). The speed control MMI 100 then updates the bar graph (arrow) on the window in FIG. 2 (steps S106 and S107). This bar graph (arrow) is likened to the speedometer of a vehicle, and indicates the current processing speed. When the maximum speed is set, the bar graph extends to the right end to indicate 100% speed. This display shifts to the left in steps every time the "brake" button is depressed, and shifts to the right in steps every time the "accelerator" button is depressed.

The bar graph in FIG. 2 is updated to show the user the speed change result. If the processing in FIG. 5 is started upon hot key operation, update processing for the bar graph may be omitted.

Figure 3:
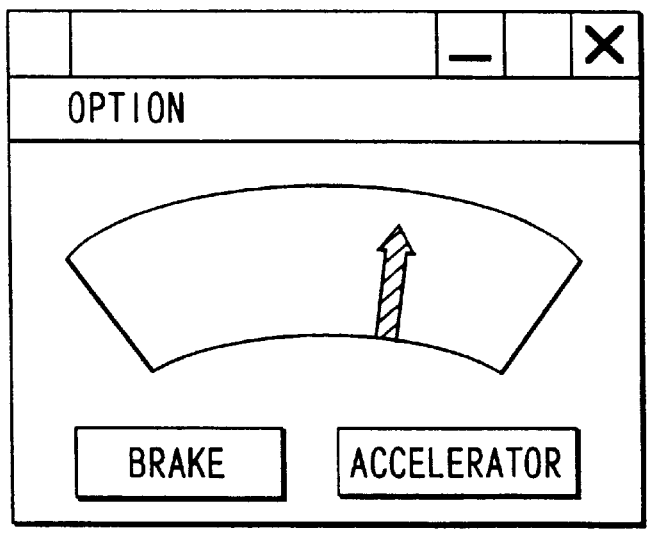
FIG. 3 is a view showing another example of the speed control window applied to the computer system of the embodiment.

FIG. 3 shows another example of the speed control window. In this example, the speed display is associated with the speedometer of a vehicle more directly. As in the display in FIG. 2, the button for increasing the speed is placed on the right side of the button for decreasing the speed.

The operations performed when the speed control hot keys are depressed are the same as those to be performed when the "accelerator" button and the "brake" button are depressed.

As described above, according to the speed control processing in this embodiment, when acceleration or deceleration of the CPU processing speed is instructed by the user with the "accelerator" button, the "brake" button, or the like, the CPU processing speed is dynamically changed. In addition, the change result is recorded on the speed management database 125 in correspondence with the name of the software, e.g., the application program, which is currently being executed. Every time the user instructs acceleration or deceleration of the CPU processing speed, speed management data is formed on the speed management database 125. By using the speed management data, therefore, the CPU processing speed can be dynamically controlled for each piece of software when it is executed.

The CPU processing speed can therefore be controlled in accordance with a user's intentions such that the CPU processing speed is increased when several specific pieces of software are to be executed, and decreased for power saving and the like when other pieces of software are to be executed, or software is executed at a standard speed. With this control, the need to reduce the power consumption and the user's wish to obtain a comfortable execution speed can be kept in balance.

If the speed must be changed every time a small piece of software such as a file manipulation program is activated, the overhead for speed change processing become undesirably large. For this reason, some programs (processes) are preferably designated in advance as processes which are not to be subjected to speed change processing; even if such a process is activated, the processing speed is kept to the immediately preceding speed. More specifically, processes which are not to be subjected to speed change processing may be defined on a low layer in the hierarchy for speed control in the registry.

Figure 6:
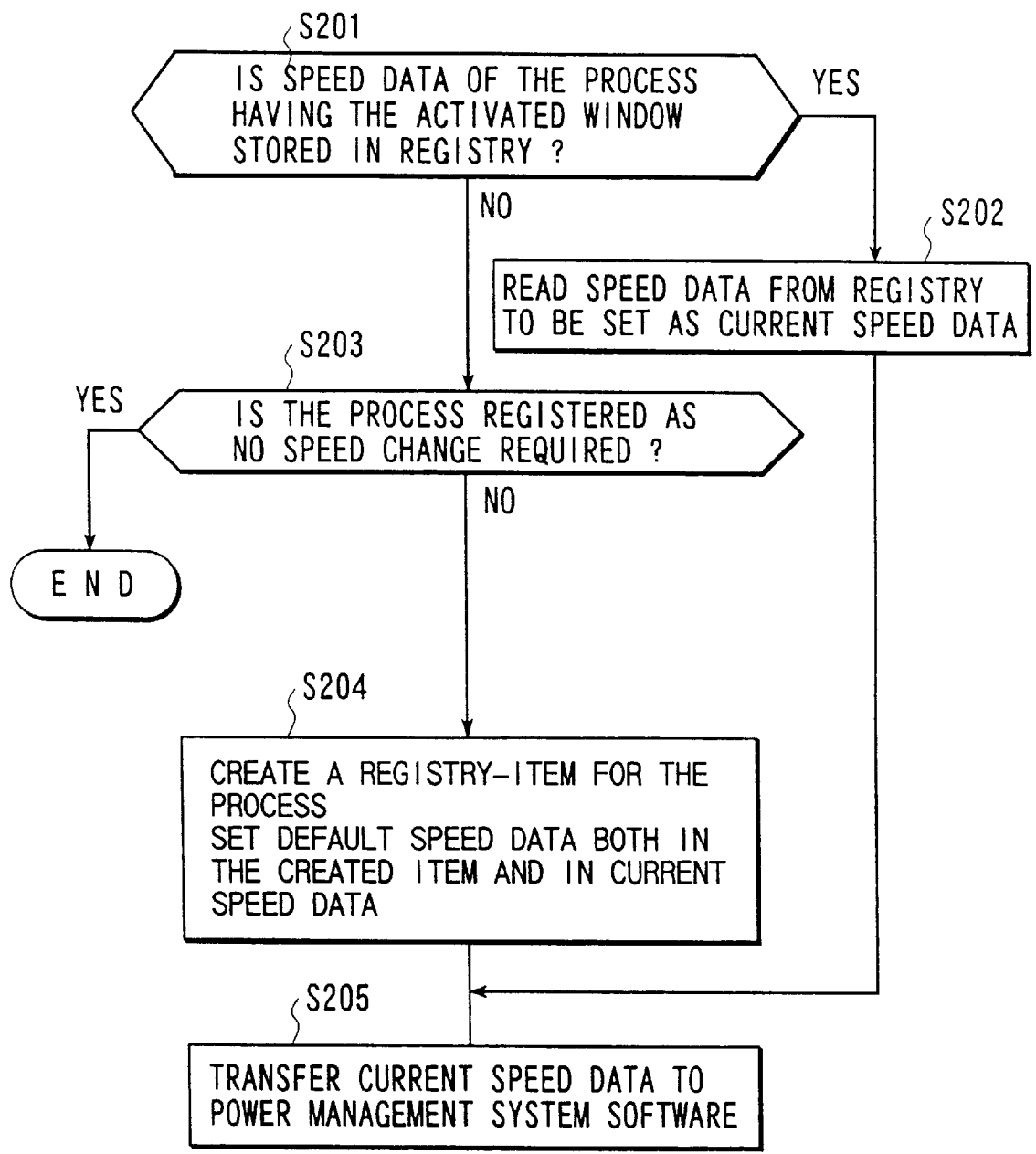
FIG. 6 is a flow chart showing a CPU processing speed changing procedure which is executed upon active process switching in the computer system of the embodiment.

In this case, for example, the processing in FIG. 6 is executed every time the active window is switched.

First of all, it is checked whether the speed data of a process of the active window is present in the registry (step S201). If YES in step S201, the speed data is read out, and the power management system software 124 is instructed to set the processing speed to the speed designated by the speed data (steps S202 and S205).

If the speed data of the process of the active window is not present in the registry, it is checked whether the process is a process registered in the registry as a process which is not to be subjected to speed change processing (step S203). If the process is a process instructed as a process which is not to be subjected to speed change processing, the processing is terminated. If the process is not a process registered as a process which is not to be subjected to speed change processing, the power management system software 124 is instructed to set the speed data to be registered in the registry as well as the current speed data to standard speed data (steps S204 and S205).

Figure 7:
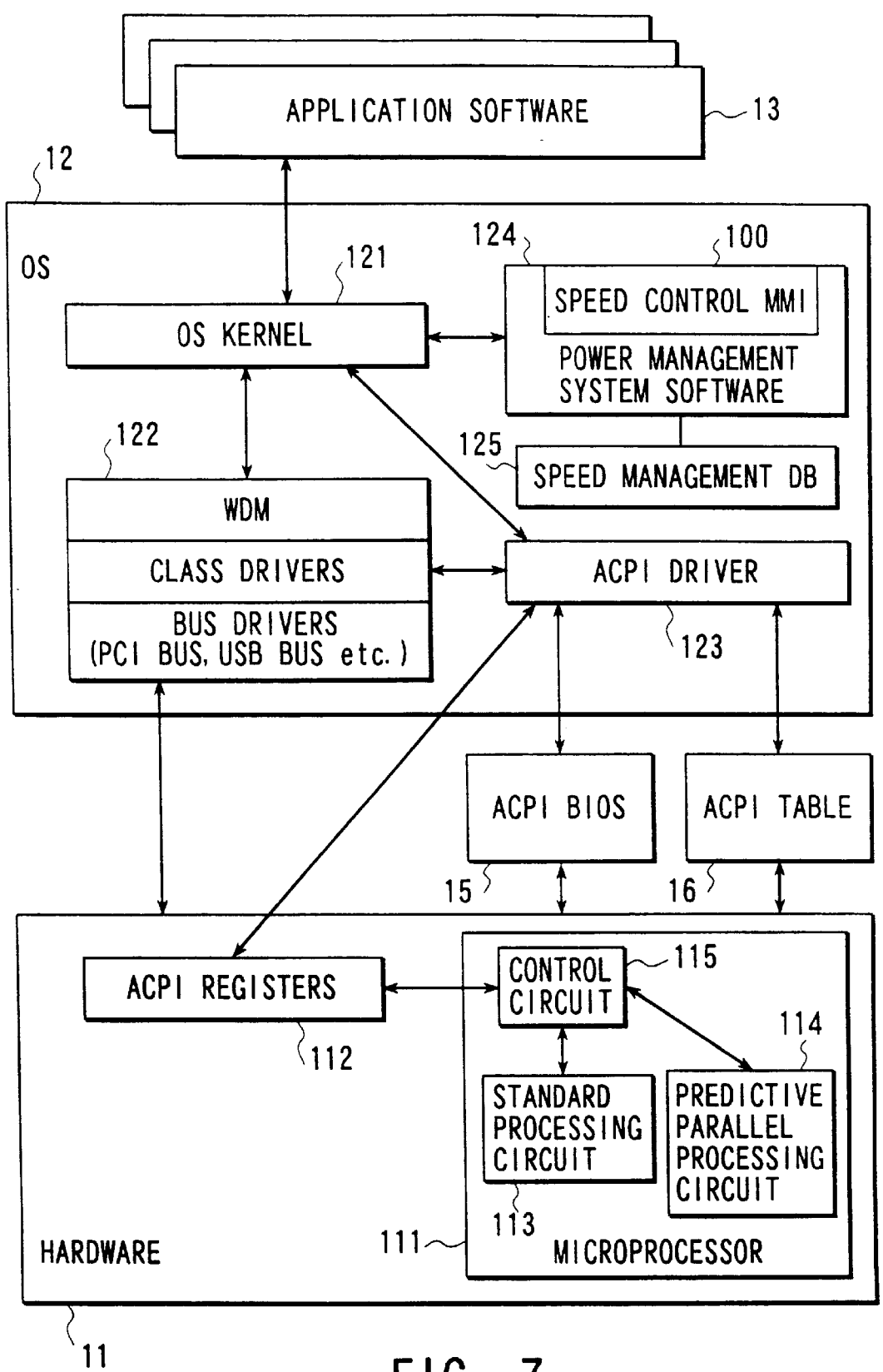
FIG. 7 is a block diagram showing the overall arrangement of a computer system according to another embodiment of the present invention.
Figure 8:
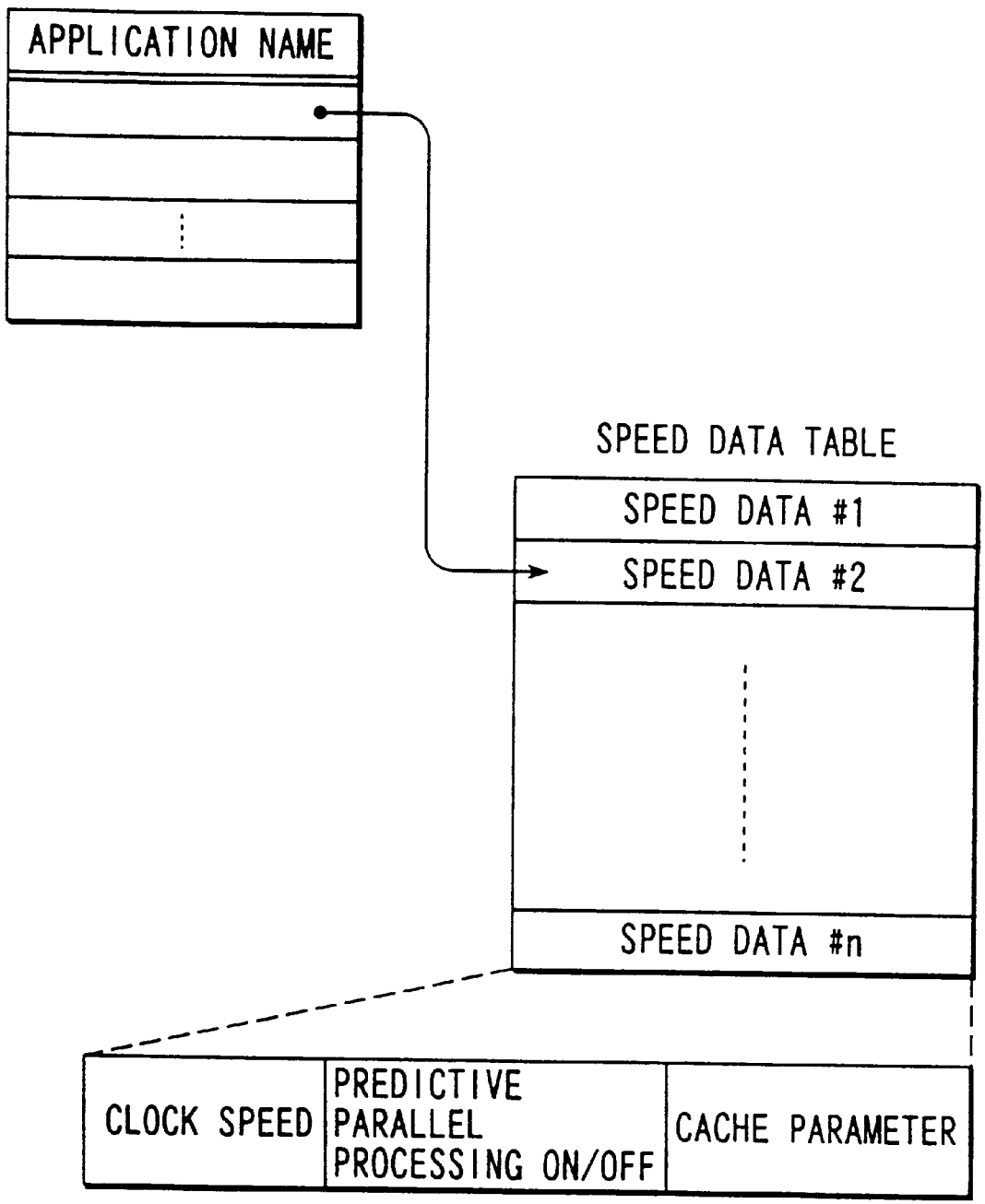
FIG. 8 is a view showing the structure of a speed management database used in the computer system of the embodiment in FIG. 7.

FIGS. 7 through 10 show another embodiment of the present invention. According to this embodiment, as shown in FIG. 8, in a speed management database 125, each speed data includes a field for storing selection data for enabling or disabling a predictive parallel processing function, in addition to the fields in the above embodiment. With this database, the CPU processing speed is controlled by a combination of multi-level control of the clock rate and two-step control of ON/OFF control of predictive parallel processing.

ON/OFF control of predictive parallel processing will be described below.

A microprocessor 111 in FIG. 7 is a superscalar processor, which performs predictive parallel processing by using a branch prediction mechanism. In a CPU that performs predictive parallel processing by using a branch prediction mechanism, an instruction word is fetched and decoded in advance in two directions, i.e., the direction in which the program branches in accordance with the conditional branch instruction and the direction in which the program does not branch, and one of the decoded words is discarded when the condition is confirmed. Fetching and decoding an instruction word in the two directions in advance will increase the processing speed, but the power consumption increases as compared with a case in which an instruction word is decoded only in one direction. This is because circuits corresponding to both cases in which a prediction is fulfilled and not fulfilled are operated, and one of the circuits becomes unnecessary as a result of the prediction. If the computer executes only necessary task in a fixed manner without performing such predictive parallel processing, the energy consumption can be essentially decreased at the cost of low processing speed. ON/OFF control of predictive parallel processing is used for this purpose.

ON/OFF switching of the branch prediction mechanism is controlled by ON/OFF-switching the supply of power or clocks to the logic circuit implementing the branch prediction mechanism in accordance with a deceleration instruction from the user. With this operation, a true trade-off between the time required for the execution of a given task and the energy required therefor can be realized.

ON/OFF control of predictive parallel processing will be described in detail below by taking the arrangement of the microprocessor ill in FIG. 7 as an example.

A standard processing circuitry 113 of the microprocessor 111 incorporates only one pipeline, but a predictive parallel processing circuit 114 incorporates three pipelines. With the pipelines in the standard processing circuitry 113 and the predictive parallel processing circuit 114, therefore, four instructions can be simultaneously issued. Obviously, the branch prediction unit is included in the predictive parallel processing circuit 114. A total of eight set associative cache sets are used as caches. Of these cache sets, two sets are included in the standard processing circuitry 113, and the six remaining sets are included in the predictive parallel processing circuit 114. In this case, for example, when power saving is required as in a case in which the user depresses the deceleration button repeatedly, the operation of the predictive parallel processing circuit 114 is disabled. This operation is performed by stopping one or both of the application of a power supply voltage and the supply of clocks to the branch prediction unit or simultaneously stopping the application of a power supply voltage and the supply of clocks to the overall predictive parallel processing circuit 114. In this case, it is important to stop the operation of the logic circuit which is exclusively used to fetch and decode instructions in advance on the basis of prediction processing. Supply/stoppage of power and clocks is controlled by a control circuit 115 on the basis of the values in an ACPI register 112.

When the power management system software 124 determines that ON/OFF switching of the predictive parallel processing circuit is required, bit 0 in a CPU arrangement change register (FIG. 9) newly set in the ACPI register 112 is turned on. When bit 0 is turned on, a system management interrupt request signal SMI is sent to the microprocessor 111. Bit 1 in the CPU arrangement change register indicates an ON/OFF request for the predictive parallel processing circuit 114, and is also set by the power management system software 124. This bit is read by a microprogram in the CPU, as will be described later.

When an SMI interrupt is accepted, the procedure in the flow chart of FIG. 10 is executed.

After the CPU state is saved by the BIOS (Basic Input and Output System) in accordance with the SMI, a microprogram for interrupt processing is executed to determine an interrupt cause (steps S301 and S302). If the interrupt is caused by the above arrangement change register, a cache flash is performed to prepare for cache rearrangement (step S303). The state of bit 1 in the CPU arrangement change register in the ACPI register 112 is read and set in a control circuit 115 in the microprocessor 111 (step S304). Thereafter, the microprocessor 111 halts its own clock (step S305). This operation is realized in the same manner as in a clock halting operation for conventional power management. In this case, the control circuit 115 in FIG. 7 keeps operating as well as the timer. The control circuit 115 performs setting to allow or inhibit the supply of clocks to the predictive parallel processing circuit 114 under the control of the sequence circuit of the control circuit on the basis of the value of bit 1 in the CPU arrangement control register, and sends a reset signal to the predictive parallel processing circuit 114 to turn on or off the power to the predictive parallel processing circuit 114 (steps S306, S307, and S308).

After a sufficient period of time, the control circuit 115 turns off the reset signal. With this operation, the microprocessor 111 is restarted. In this case, the control circuit 115 sends a control signal to the control circuit for the microprogram to resume the microprogram for a CPU arrangement change interrupt instead of booting the computer. This operation is equivalent to a resume/reset operation in the prior art.

In this manner, the predictive parallel processing circuit 114 is ON/OFF switched.

If such two-step speed control by ON/OFF switching of the predictive parallel processing circuit 114 is used in combination with other elements such as the above clock rate control, multi-step speed control can be realized.

FIGS. 11 through 14 show modifications of the GUI environments in FIGS. 2 and 3.

In a compact computer such as a notebook personal computer, the clock rate of the CPU must be forcibly decreased owing to generation of heat or the like in some cases. In such a case, the upper limit to which the CPU speed can be increased by manipulation of the accelerator by the user is preferably displayed. Each of areas 201 and 203 in FIGS. 11 and 12 correspond to the red zone of the speedometer of a vehicle. That is, the user cannot increase the CPU speed beyond the upper speed limit indicated by the areas 201 and 203 even if he/she manipulates the accelerator. In the prior art, when the CPU speed is forcibly decreased owing to generation of heat or the like, the user cannot know why the CPU speed is decreased. In this embodiment, however, the upper limit of the CPU speed is variably presented to the user in accordance with CPU operation environment conditions such as generation of heat, and hence a user-friendly GUI environment can be provided.

Figure 11:
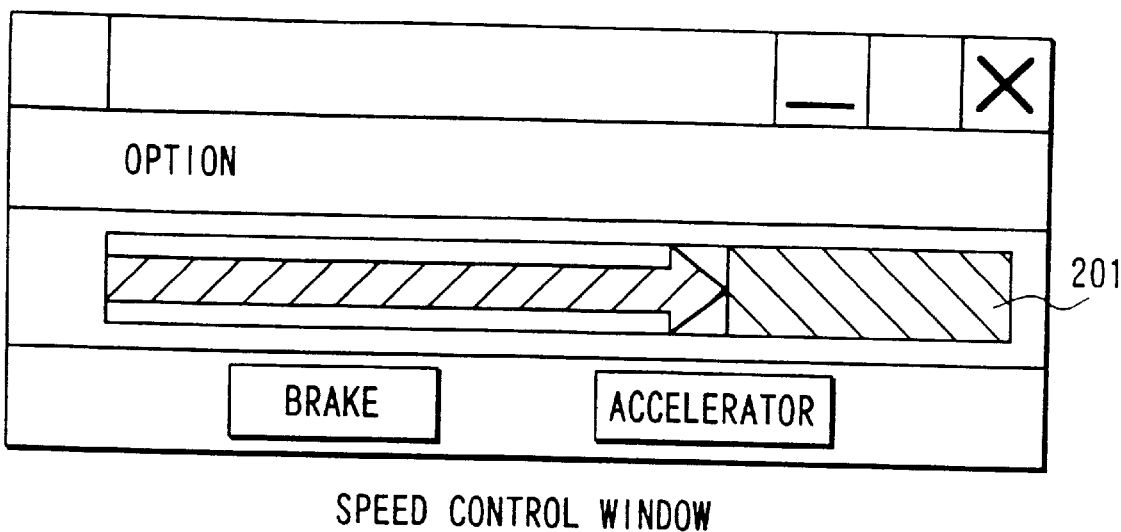
FIG. 11 is a view showing a modification of the GUI environment (speed control window) shown in FIG. 2.
Figure 12:
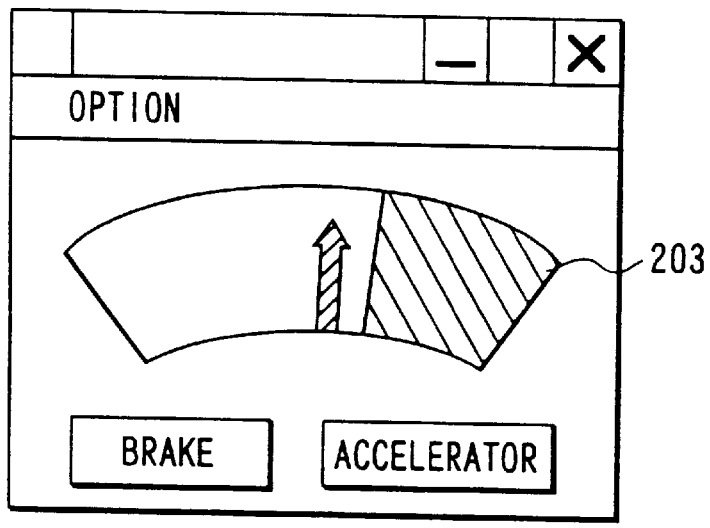
FIG. 12 is a view showing a modification of the GUI environment (speed control window) shown in FIG. 3.
Figure 13:
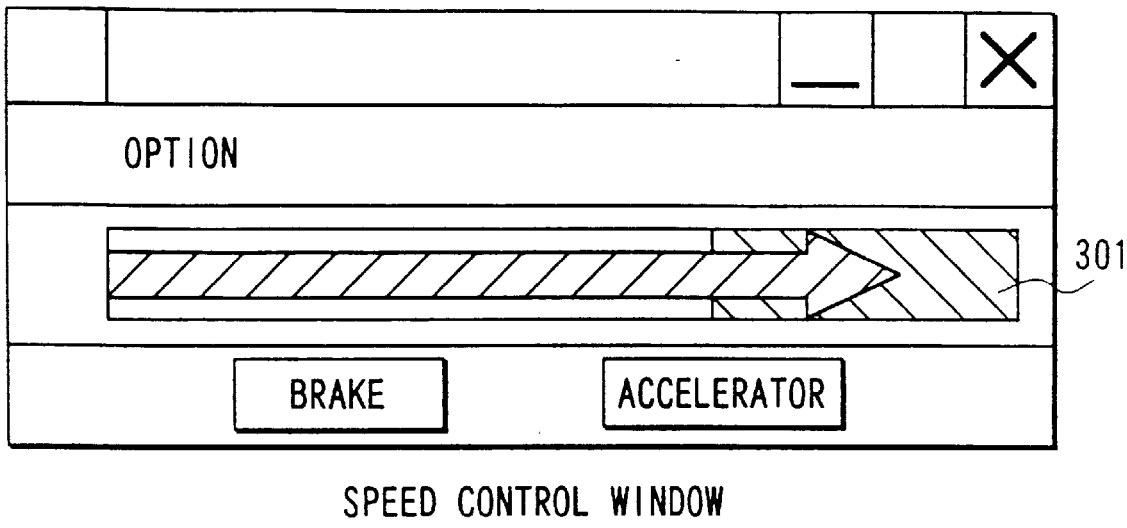
FIG. 13 is a view showing another modification of the GUI environment (speed control window) shown in FIG. 2.
Figure 14:
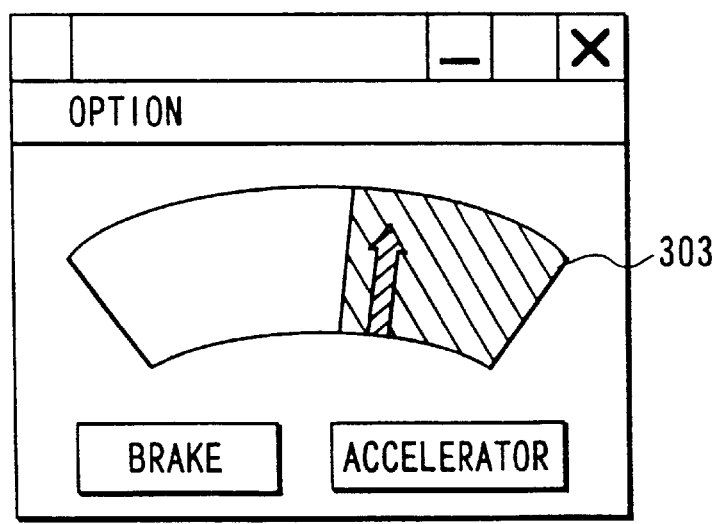
FIG. 14 is a view showing another modification of the GUI environment (speed control window) shown in FIG. 3.

FIGS. 13 and 14 show modifications of the GUI environments in FIGS. 11 and 12, respectively. In these modifications, in response to an accelerator manipulation by the user, an increase in CPU speed beyond the upper speed limit is temporarily allowed. In this case, the CPU speed is temporarily increased beyond the upper speed limit, but the CPU speed is forcibly decreased by, e.g., two steps afterward.

Since a GUI environment which allows the user to easily and visually recognize the operation environment of the CPU is provided in this manner, the computer can be used in various manners in accordance with a demand from each user. If, for example, a given user wants to execute a task with a heavy load, he/she may temporarily manipulate the brake to decrease the CPU speed so as to allow the CPU to have sufficient capacity. Thereafter, the user manipulates the accelerator to increase the CPU speed so as to execute the above task. In this manner, arbitrary selection can be performed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A computer system comprising:
   a first circuit configured to execute a processing function;
   a second circuit configured to execute a predictive parallel processing function using branch prediction;
   means for receiving a request; and
   a control circuit configured to inhibit execution of the predictive parallel processing function of the second circuit in accordance with the request.

2. The computer system according to claim 1, wherein the control circuit includes means for ON/OFF-switching supply of power to the second circuit.

3. The computer system according to claim 1, wherein the control circuit includes means for ON/OFF-switching supply of clocks to the second circuit.

4. The computer system according to claim 1, wherein the request is a speed change request.

5. The computer system according to claim 1, wherein the first circuit further includes a first processing pipeline and the second circuit further includes a second processing pipeline.

6. A processor comprising:
   a first circuit configured to execute a processing function;
   a second circuit configured to execute a predictive parallel processing function using branch prediction;
   means for receiving a request; and
   a control circuit configured to inhibit execution of the predictive parallel processing function of the second circuit in accordance with the request.

7. The processor according to claim 6, wherein the control circuit includes means for ON/OFF-switching supply of power to the second circuit.

8. The processor according to claim 6, wherein the control circuit includes means for ON/OFF-switching supply of clocks to the second circuit.

9. The processor according to claim 6, wherein the request is a speed change request.

10. The computer system according to claim 6, wherein the first circuit further includes a first processing pipeline and the second circuit further includes a second processing pipeline.

11. A method for controlling a processor having a first circuit for executing processing and a second circuit for executing a predictive parallel processing function using branch prediction, the method comprising the steps of:
    receiving a request, and
    inhibiting the execution of the parallel processing function of the second circuit in accordance with the request.

12. The method according to claim 11, wherein the inhibiting step further includes ON/OFF-switching supply of power to the second circuit.

13. The method according to claim 12, wherein the inhibiting step further includes the steps of:
    issuing an interrupt signal;
    saving a state of the processor in accordance with the interrupt signal;
    rearranging a cache in accordance with the interrupt signal;
    halting a clock of the second circuit;
    setting the ON/OFF of power supply to the second circuit; and
    restarting the processor.

14. The method according to claim 11, wherein the inhibiting step further includes ON/OFF-switching supply of clocks to the second circuit.

15. The method according to claim 14, wherein the inhibiting step further includes the steps of:
    issuing an interrupt signal;
    saving a state of the processor in accordance with the interrupt signal;
    rearranging a cache in accordance with interrupt signal;
    halting a clock of the second circuit;
    setting the ON/OFF of clock supply to the second circuit; and
    restarting the processor.

16. A computer system which executes an application program using at least a standard processing circuit and optionally using a parallel predictive processing circuit, the apparatus comprising:
    a storing unit configured to store speed data of the application program; and
    a control circuit configured to read the speed data of an application program to be executed and determine whether the parallel predictive processing circuit is used to execute the application program.

17. The computer system according to claim 16, further comprising means for providing a reset signal to the parallel predictive processing circuit and setting an ON/OFF of a power supply to the circuit when the control circuit determines that the parallel predictive processing circuit is not used.

18. The computer system according to claim 16, wherein at least one of the speed data includes a clock speed.

19. The computer system according to claim 16, wherein at least one of the speed data includes a cache parameter.

* * * * *